(12) United States Patent
Bosley et al.

(10) Patent No.: US 7,885,034 B2
(45) Date of Patent: Feb. 8, 2011

(54) CONTACTLESS METHOD FOR POWER AND COMMUNICATIONS IN A TAPE LIBRARY

(75) Inventors: Jonathan E. Bosley, Saratoga Springs, UT (US); Aaron L. Herring, Tucson, AZ (US); Daniel S. Moore, Tucson, AZ (US); Shawn M. Nave, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1183 days.

(21) Appl. No.: 11/531,336

(22) Filed: Sep. 13, 2006

(65) Prior Publication Data

US 2008/0062559 A1 Mar. 13, 2008

(51) Int. Cl.
*G11B 15/00* (2006.01)
(52) U.S. Cl. ....................................................... 360/90
(58) Field of Classification Search ................... 360/92, 360/90, 96.51, 96.3, 251.2, 251.1, 251.3, 360/251.4
See application file for complete search history.

(56) References Cited

U.S. PATENT DOCUMENTS

| 6,198,593 | B1 | 3/2001 | Hori et al. ..................... 360/92 |
| 6,909,940 | B2 | 6/2005 | Hellman et al. ............. 700/245 |
| 7,316,023 | B2 * | 1/2008 | Kim et al. .................... 720/604 |
| 2003/0045177 | A1 * | 3/2003 | Kamei et al. ................ 439/701 |
| 2004/0117807 | A1 * | 6/2004 | Takahashi et al. ........... 720/610 |
| 2004/0205785 | A1 * | 10/2004 | Takahashi et al. ........... 720/601 |
| 2004/0261088 | A1 * | 12/2004 | Hsu et al. .................... 720/601 |
| 2005/0113972 | A1 | 5/2005 | Kumhyr ..................... 700/245 |
| 2005/0198659 | A1 * | 9/2005 | Ahn et al. .................... 720/650 |
| 2007/0006240 | A1 * | 1/2007 | Harada et al. ............... 720/610 |
| 2007/0124746 | A1 * | 5/2007 | Shizuya et al. .............. 720/649 |

* cited by examiner

*Primary Examiner*—Allen T Cao
(74) *Attorney, Agent, or Firm*—Hamilton & Terrile, LLP; Stephen A. Terrile

(57) ABSTRACT

A tape library is provided with a fixed coupling mechanism so that the tape library includes discrete locations via which power and communication are provided to an accessor. The use of such a coupling mechanism in a vertical tape library allows for the use of gravity to ensure that the accessor can couple with the fixed coupling mechanism even when no power is present in the accessor.

6 Claims, 5 Drawing Sheets

CONTACTLESS METHOD FOR POWER AND COMMUNICATIONS IN A TAPE LIBRARY

BACKGROUND OF THE INVENTION

1. Field of the Invention

The invention relates in general to computer networks and more particularly to a contactless method for power and communications in a tape library.

2. Description of the Related Art

It is known to use high density, removable media storage libraries within a data storage system to provide large quantities of storage in networked computer systems. Typically, such data storage systems are employed for backup or other secondary storage purposes, but the data storage system may also be used as primary storage in circumstances that are conducive to sequential data access and the like. Often the data is stored on media cartridges, such as magnetic tapes or optical disks, which are arranged in storage bins and accessed when data on a cartridge is requested. Known media cartridges are capable of storing large quantities of data. A storage system may include a plurality of legacy storage devices (i.e., devices which are not specifically designed to work with a more current data storage system.)

In the data-processing technology, automated data-storage libraries are frequently utilized for the storage of various data media which are employed in data-processing systems. Generally, such data-processing systems necessitate the provision of considerable amounts of data-storage capacity which, upon occasion, may be needed rapidly, and stored in memory and hard disk drives, and whereby the various data may not be necessarily provided in a rapid manner. Consequently, data which are not required to be employed in an immediate manner may constitute frequently accessed data whereby the storage thereof may be in removable data-storage media, such as magnetic tape cartridges, optical disk cartridges or the like, which may be stored in storage bins, or so-called cells provided in the automated data-storage libraries.

Basically, the electro-mechanical devices which transport such tape or optical disk cartridges from one location to another within the automatic data-storage library are arranged on a robot which is adapted to travel the full length of the library, and wherein the robot receives both electrical power and information as to the location to which or from which it is to move and what it is to do in its physical applications, through the intermediary of a cable connection. Consequently, in order to ensure the ready and unobstructed movement of the robot along the entire length of the automated data-storage library, the utilized cable limits the design of the scalable library. Moreover, the cable also requires replacement when the library is extended with additional units to reach new and greater lengths for the library, thereby incurring additional costs and operating expenditures for this purpose. A desirable aspect would be to be able to eliminate the cable or tethering of the robot by eliminating the cable arrangement and providing a wireless-operated robot which essentially must be supplied continuously with electrical operating power without any interruption in the functioning and motion of the robot through the extent of the library.

SUMMARY OF THE INVENTION

In accordance with the present invention, a tape library is provided with a fixed coupling mechanism so that the tape library includes discrete locations via which power is provided to an accessor. The use of such a coupling mechanism in a vertical tape library allows for the use of gravity to ensure that the accessor can move to a location where the accessor can electronically couple with the fixed coupling mechanism even when no power is present in the accessor. A tape library is provided with an inductive coil transfer mechanism so that rather than having continuous coils for inductive coupling there are discrete locations where there is a fixed coupler. With such a coupling mechanism alignment issues are much easier to solve and the cost associated with the track can be much lower than in a continuous solution.

More specifically, in one embodiment, the invention relates to a storage device. The storage device includes a storage device housing and an accessor. The storage device housing includes a fixed coupling mechanism. The accessor includes an accessor coupling mechanism which is positioned to couple with the fixed coupling mechanism as the accessor travels within the storage device housing.

In another embodiment, the invention relates to a tape storage system which includes a host and a storage device. The storage device includes a storage device housing and an accessor. The storage device housing includes a fixed coupling mechanism. The accessor includes an accessor coupling mechanism which is positioned to couple with the fixed coupling mechanism as the accessor travels within the storage device housing.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
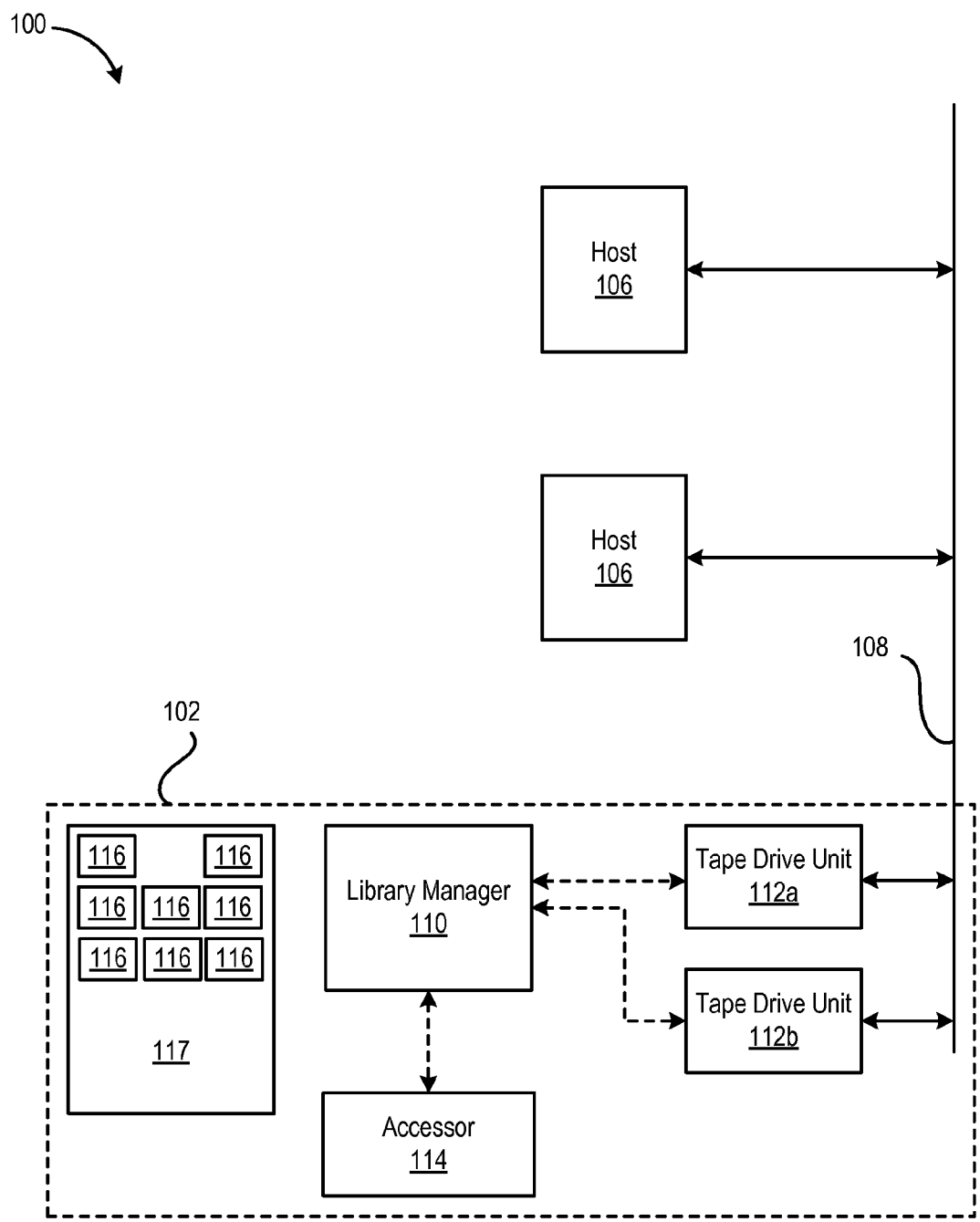
FIG. 1 shows a schematic block diagram illustrating a representative tape storage system.

Referring to FIG. 1, a schematic block diagram of a representative tape storage system 100 is shown. The system 100 includes at least one automated tape library unit 102 and at least one host 106. Each host 106 may be a mainframe computer. Alternatively, the host 106 may be a server or personal computer using a variety of operating systems. The host 106 is coupled to a storage area network (SAN) 108 or similar communications channel.

The automated tape library unit 102 includes a library manager 110, one or more data drive devices, which may be tape drive units 112, an accessor 114, and a plurality of media cartridges 116. The plurality of media cartridges 116 may be stored in one or more media cartridge storage bins 117.

The library manager 110 is interconnected with the tape drive units 112 and the accessor 114 and controls the actions of the accessor 114. The library manager 110 may also provide a graphical user interface or a remote web interface so that a user can control the operating parameters of the automated tape library unit 102 independently of the host 106.

The automated tape library unit 102 is shown with two tape drive units 112a and 112b. The present invention is operable with one or any larger number of tape drive units 112. The tape drive units 112 may share one single repository of cartridges 116. Alternatively, the tape drive units 112 may independently correspond to and utilize multiple repositories of cartridges 116. The tape library units 102 may be distributed over multiple locations to decrease the probability that multiple tape library units 102 will be incapacitated by a disaster in one location.

The interconnections between the library manager 110, the tape drive units 112, and the accessor 114 are shown as dashed lines to indicate that the library manager 110 transmits and receives control signals, rather than data to be stored or retrieved, to the tape drive units 112 and/or the accessor 114. Data for storage or retrieval may instead be transmitted directly between the host 106 and the tape drive units 112 via a network 108, which may be a storage area network (SAN), a local area network (LAN), a wide area network (WAN), or a different type of network, such as the Internet or a direct connection between the host 106 and the tape drive devices 112.

The accessor 114 may be a robotic arm or other mechanical device configured to transport a selected cartridge 116 between a storage bin (also referred to as a storage cell) and a tape drive unit 112. The accessor 114 typically includes a cartridge gripper and a bar code scanner (not shown), or similar read system, mounted on the gripper. The bar code scanner is used to read a volume serial number (VOLSER) printed on a cartridge label affixed to the cartridge 112. The tape drive units 112 may be replaced by optical disk drives or other magnetic drives. Similarly, the cartridges 116 may contain magnetic media, optical media, or any other removable media corresponding to the type of drive employed.

Figure 2:
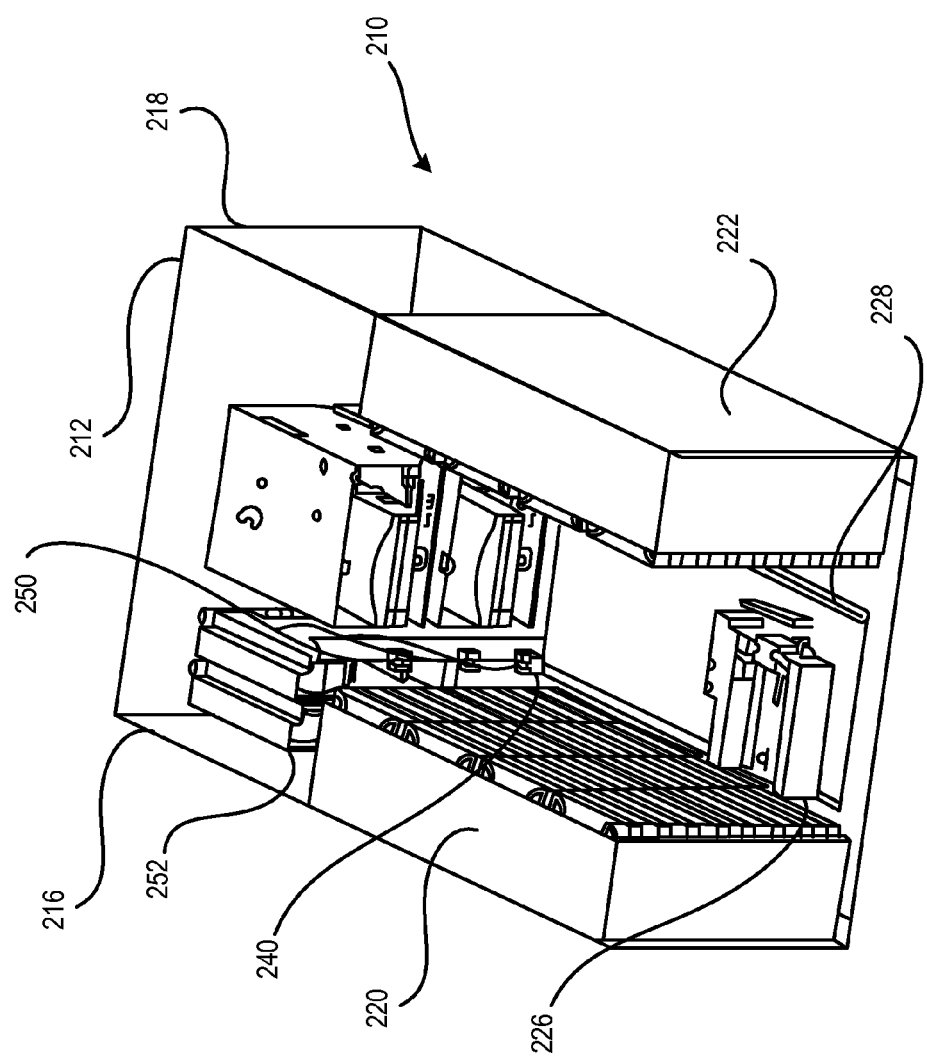
FIG. 2 shows a perspective view of the automated data-storage library.
Figure 3:
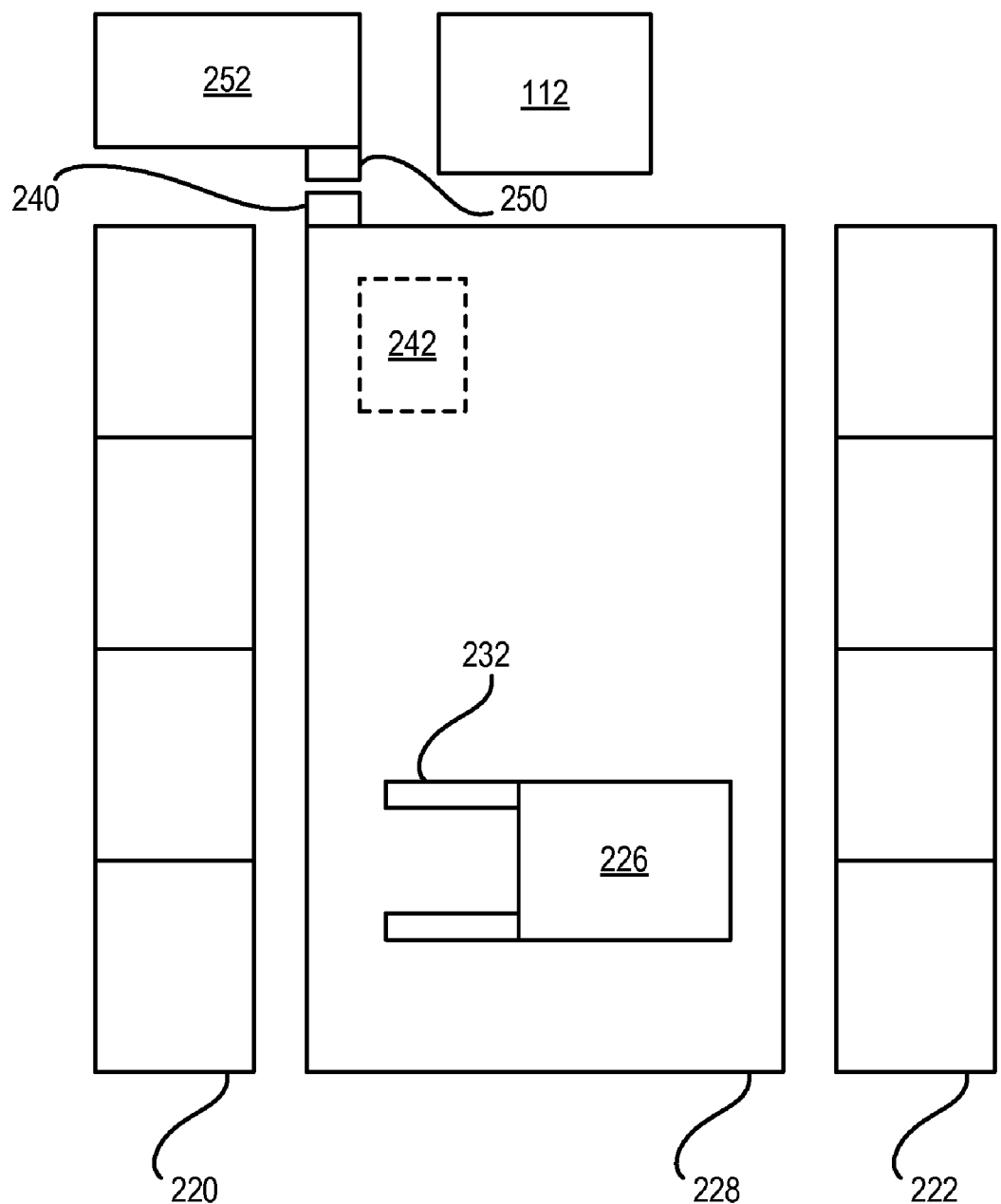
FIG. 3 shows, generally diagrammatically, a top plan view of an automated data-storage library.
Figure 4:
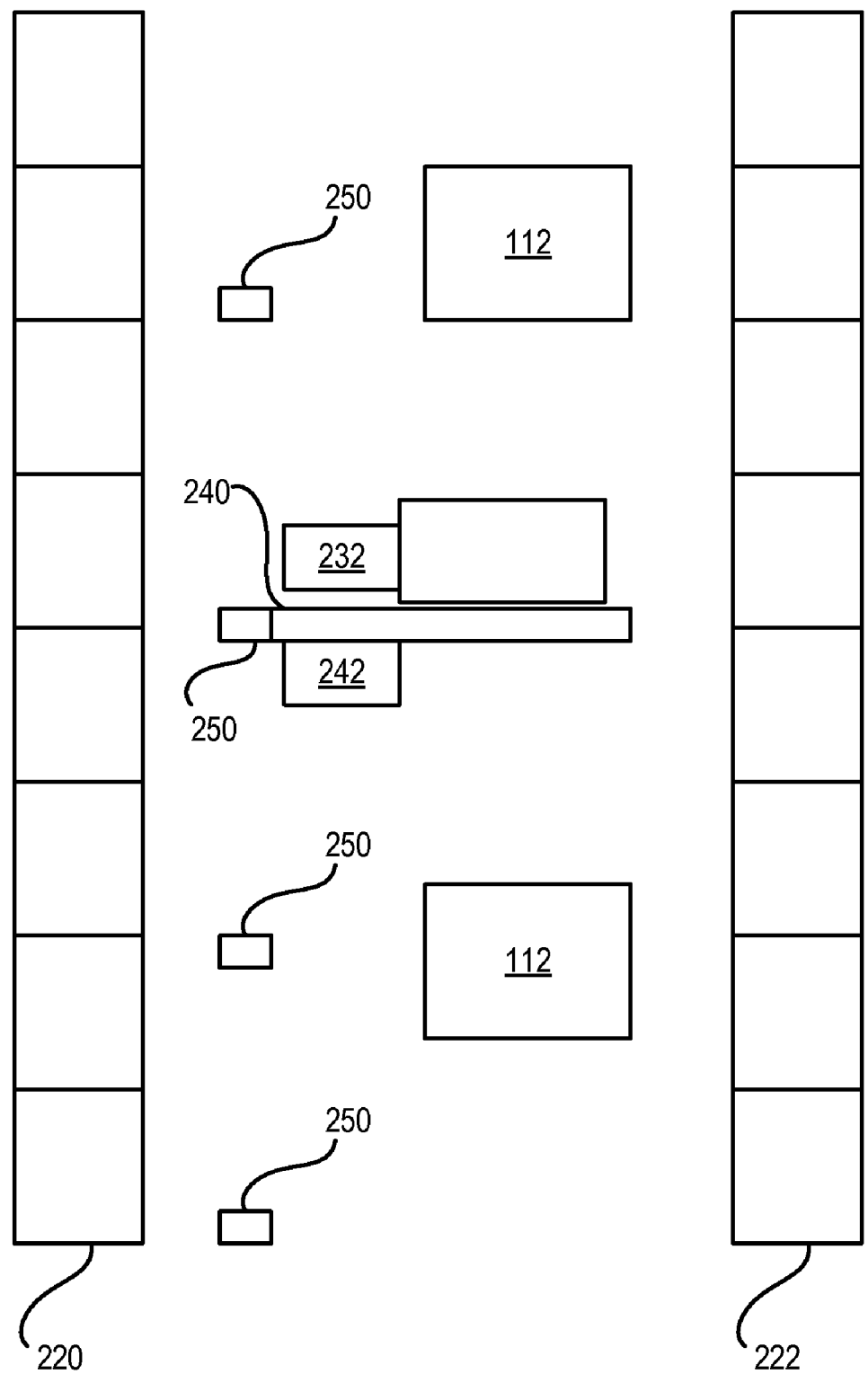
FIG. 4 shows, generally diagrammatically, an end plan view of the automated data-storage library.

Referring to FIGS. 2-5, a data-storage library 210 is shown. The data-storage library 210 is one example of an automated tape storage unit 102. More specifically, FIG. 2 shows a perspective view of the automated data-storage library 210. FIG. 3 shows, generally diagrammatically, a top plan view of the automated data-storage library 210. FIG. 4 shows, generally diagrammatically, an end plan view of the automated data-storage library 210.

The library 210 includes a housing structure 212 containing a plurality of data-storage arrays, capable at times to store a large number of tape cartridges (not shown) which although if even not frequently accessed, may be needed rapidly at certain times to provide information or the storing of data by an external user.

The storage bins in a vertical library 210 may be provided at opposite sides of walls 216, 218 facing each other on which tape storage arrays 220, 222, respectively, are positioned. Each tape storage array 220, 222 includes a plurality of rows and a plurality of columns of data-storage cells in which tapes may be stored. The cells may be traversed by a robotic picker 226 traveling along an accessor tray 228. Thus the robotic picker 226 and accessor tray 228 function as an accessor 114 controlled via the library manager 110.

The accessor tray 228 and the robotic picker 226 travel over substantially the full height of the interior of the data-storage library 210. The robotic picker 226 may be transported from one end to the other end of the tray 228 so that the robotic picker 226 has access to the length of the library. The robotic picker 226 may also be rotatable about its own vertical axis so as to facilitate the positioning of an array of media fingers 232 on the robotic picker 226 in particular orientation with selected media cells or shelves on opposite sides. Thus, although the fingers 232 are shown extending from one side of the robotic picker 226 for either engaging or transporting or retrieving media represented by tape cartridges or the like from or into the cells on the array 220, the robotic picker 226 may be rotated about its vertical axis so as to enable the media fingers 232 to engage media such as tape cartridges at the opposite wall 222 as desired during the operation of the library. Thus, the media tapes may be continuously accessible to a user.

To avoid having to attach cables which are adapted to supply electrical power to the robotic picker 226, the vertical tape library 210 is provided with discrete locations for the accessor tray 228 to receive power and communications. The accessor tray 228 stops at a row of cells or tape drives to allow the robotic picker 226 to perform work at that row. Thus, the accessor tray 228 functions as an elevator for the robotic picker 226. The robotics needed to grab and manipulate the tape cartridges from tape drives to storage slots are positioned on the accessor tray 228. The accessor tray 228 travels up and down the vertical tape library to reach different rows of the vertical tape library.

The accessor tray 228 includes an inductive coupling mechanism 240 as well as a power storage device 242 (e.g., a capacitor or a rechargeable battery). Various rows of the vertical tape library include a respective fixed coupling mechanism 250 to which a power and control device 252 is coupled. The fixed coupling mechanism 250 interacts with the inductive coupling mechanism 240 of the accessor tray 228. Thus, the fixed coupling mechanism 250 functions like one half of a transformer and the inductive coupling mechanism 240 functions like the other half of a transformer.

When the accessor tray 228 is stopped at a row of cells or tape drives of the vertical tape library having a fixed coupling mechanism 250, the two halves of the coupling mechanism are aligned (with a small air gap) and thus an inductive coupling is generated. The inductive coupling enables both power and communications to be provided from the power and control device 252 to the robotic picker 226 positioned on the accessor tray 228. The power storage device 242 located on the accessor tray 228 stores enough energy to allow for the accessor tray 228 to travel up to the next row at which a fixed coupling mechanism is positioned. The accessor tray 228 then couples again and obtains more energy (and any additional communications information). If at any time the accessor tray 228 loses power, does not have enough power stored or fails to travel to the next coupling mechanism, then the accessor tray 228 simply drops down to a lower row at which a fixed coupling is positioned and uses that coupler to store the energy needed to continue operation.

Because each coupling station is associated with the housing structure 212, the tape library power system provides a cost scheme which does not increase the cost for expansion capabilities in the base unit. Also, because there are discrete locations, mechanical issues may be resolved to achieve very good coupling as compared with something that allows for motion while coupling. Because occasions may occur where the robotics do not have power, this approach is best suited for a vertical tape library to allow for gravity to ensure that the accessor tray 228 can always access a coupling station. However, the approach may be used in configurations which are substantially vertical (i.e., configurations in which the accessor tray travels along a path where there is enough of a vertical component that a gravitational force can move the accessor tray to a lower coupling station).

From the foregoing it is clearly apparent that the supply of power and communication to the robot, particularly in an automated data-storage library, is clearly simple to install and inexpensive to operate, while facilitating continuous operation of the automated data-storage library.

Figure 5:
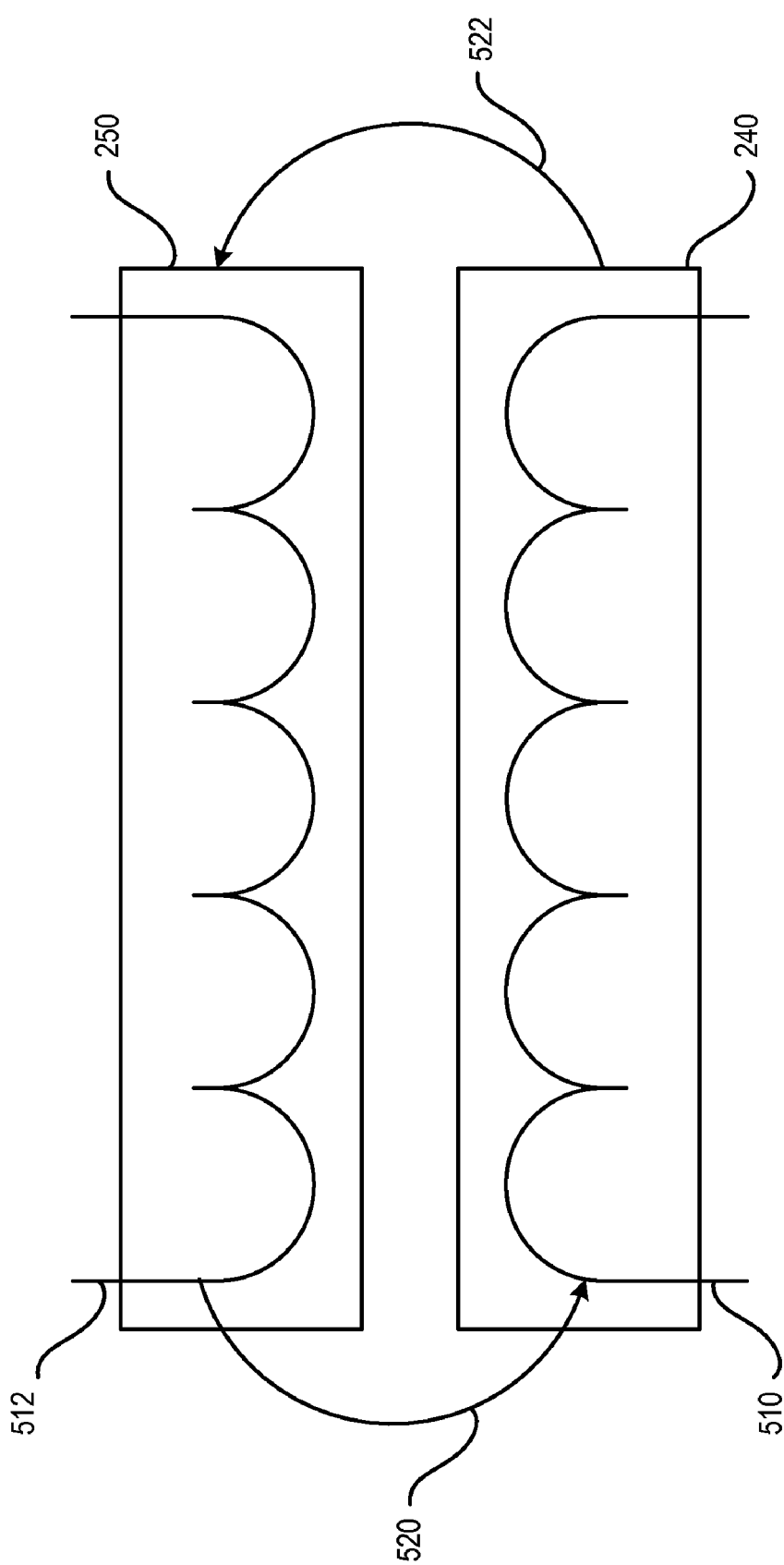
FIG. 5 shows, generally diagrammatically, a top plan view of an accessor tray coupling and a discreet inductive coupling pick up.

FIG. 5 shows, generally diagrammatically, a top plan view of an accessor tray coupling and a discreet inductive coupling pick up. More specifically, the accessor tray coupling mechanism 240 includes an inductor 510. The fixed coupling mechanism 250 includes an inductor 512. The inductor 510 and inductor 512 allow power to be provided from the fixed coupling mechanism 250 to the accessor tray coupling mechanism 240 via inductive coupling (see e.g., arrow 520). The inductor 510 and inductor 512 allow communication information to be exchanged between the fixed coupling mechanism 250 and the accessor tray coupling mechanism 240 via inductive coupling (see e.g., arrows 520, 522).

While the invention has been particularly shown and described with respect to preferred embodiments thereof, it will be understood by those skilled in the art that the foregoing and other changes in form and details may be made therein without departing from the spirit and scope of the invention.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, a tape library may be provided with coupling mechanisms positioned to correspond to each drive within the tape library. Also for example, a tape library may be provided with a single coupling mechanism positioned at the lowest gravity point of the path along which the accessor tray moves.

Also, for example, the above-discussed embodiments include modules that perform certain tasks. The modules discussed herein may include script, batch, or other executable files. The modules may be stored on a machine-readable or computer-readable storage medium such as a disk drive. Storage devices used for storing modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A storage device comprising:
a storage device housing, the storage device housing comprising a fixed coupling mechanism,
an accessor, the accessor comprising an accessor coupling mechanism, the accessor coupling mechanism being positioned to couple with the fixed coupling mechanism as the accessor travels within the storage device housing, the accessor comprising
an accessor tray, the accessor coupling mechanism being positioned on the accessor tray; and,
a robot, the robot being moved substantially vertically within the storage device housing by the accessor tray.

2. A storage device comprising:
a storage device housing, the storage device housing comprising a fixed coupling mechanism,
an accessor, the accessor comprising an accessor coupling mechanism, the accessor coupling mechanism being positioned to couple with the fixed coupling mechanism as the accessor travels within the storage device housing; and wherein
the fixed coupling mechanism includes an inductor;
the accessor coupling mechanism includes an inductor; and,
the fixed coupling mechanism and the accessor coupling mechanism are coupled via inductive coupling.

3. The storage device of claim 2 wherein:
power is provided to the accessor when the fixed coupling mechanism is coupled to the accessor coupling mechanism.

4. A tape storage system comprising:
a host;
a storage device coupled to the host, the storage device comprising
a storage device housing, the storage device housing comprising a fixed coupling mechanism,
an accessor, the accessor comprising an accessor coupling mechanism,
the accessor coupling mechanism being positioned to couple with the fixed coupling mechanism as the accessor travels within the storage device housing, the accessor comprising
an accessor tray, the accessor coupling mechanism being positioned on the accessor tray; and,
a robot, the robot being moved substantially vertically within the storage device housing by the accessor tray.

5. A tape storage system comprising:
a host;
a storage device coupled to the host, the storage device comprising
a storage device housing, the storage device housing comprising a fixed coupling mechanism,
an accessor, the accessor comprising an accessor coupling mechanism,
the accessor coupling mechanism being positioned to couple with the fixed coupling mechanism as the accessor travels within the storage device housing; and wherein
the fixed coupling mechanism includes an inductor;
the accessor coupling mechanism includes an inductor; and,
the fixed coupling mechanism and the accessor coupling mechanism are coupled via inductive coupling.

6. The tape storage system of claim 5 wherein:
power is provided to the accessor when the fixed coupling mechanism is coupled to the accessor coupling mechanism.

* * * * *